United States Patent
Ichikawa et al.

(10) Patent No.: US 10,525,983 B2
(45) Date of Patent: Jan. 7, 2020

(54) AUTOMATIC DRIVING SYSTEM AND VEHICLE CONTROL METHOD

(71) Applicant: TOYOTA JIDOSHA KABUSHIKI KAISHA, Toyota-shi, Aichi-ken (JP)

(72) Inventors: Kentaro Ichikawa, Shizuoka-ken (JP); Kunihito Satou, Mishima (JP); Bunyo Okumura, Susono (JP); Maiko Hirano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 113 days.

(21) Appl. No.: 15/700,738

(22) Filed: Sep. 11, 2017

(65) Prior Publication Data

US 2018/0072326 A1 Mar. 15, 2018

(30) Foreign Application Priority Data

Sep. 12, 2016 (JP) ................................. 2016-177888

(51) Int. Cl.
*B60W 50/08* (2012.01)
*B60W 30/182* (2012.01)
(Continued)

(52) U.S. Cl.
CPC .......... *B60W 50/082* (2013.01); *B60Q 1/343* (2013.01); *B60Q 1/346* (2013.01); *B60Q 1/40* (2013.01);
(Continued)

(58) Field of Classification Search
CPC ........ B60Q 1/34; B60Q 1/346; G05D 1/0061; G01C 21/3626; G01C 21/3661;
(Continued)

(56) References Cited

U.S. PATENT DOCUMENTS 5,774,073 A * 6/1998 Maekawa .......... G01C 21/3415
340/990
8,577,554 B2 11/2013 Wolterman
(Continued)

FOREIGN PATENT DOCUMENTS

DE 10 2013 012 779 A1 2/2015
JP 09039650 A * 2/1997
(Continued)

OTHER PUBLICATIONS

EPO machine translation of JP 2016-038846 (original JP document published Mar. 22, 2016) (Year: 2016).*
(Continued)

*Primary Examiner* — Behrang Badii
*Assistant Examiner* — David A Testardi
(74) *Attorney, Agent, or Firm* — Sughrue Mion, PLLC

(57) ABSTRACT

An automatic driving system, that switches a driving state of a vehicle from automatic driving to manual driving due to a driver's operation during automatic driving of the vehicle, includes an electronic control unit configured to: determine whether a turning-off condition is satisfied when a direction indicator under the automatic driving is in a turned-on state and the driver's operation is performed; switch a driving state from the automatic driving to the manual driving and maintain the turned-on state of the direction indicator when the direction indicator is in the turned-on state and the driver's operation has been performed; determine whether the turning-off condition is satisfied based on a position of the vehicle under the manual driving or a traveling state of the vehicle under the manual driving; switch the direction indicator from the turned-on state to the turned-off state when it is determined that the turning-off condition is satisfied.

8 Claims, 7 Drawing Sheets

(51) Int. Cl.
*B60Q 1/34* (2006.01)
*G05D 1/00* (2006.01)
*B60Q 1/40* (2006.01)

(52) U.S. Cl.
CPC ......... *B60W 30/182* (2013.01); *G05D 1/0061* (2013.01); *B60W 2520/10* (2013.01); *B60W 2540/18* (2013.01); *B60W 2540/20* (2013.01); *G05D 2201/0213* (2013.01)

(58) Field of Classification Search
CPC . G01C 21/3697; B60W 10/30; B60W 30/182; B60W 50/082
See application file for complete search history.

(56) References Cited

U.S. PATENT DOCUMENTS

| | | | |
|---|---|---|---|
| 2005/0171694 A1* | 8/2005 | Schirmer | G01C 21/3626 701/411 |
| 2005/0187710 A1* | 8/2005 | Walker | B60Q 1/34 701/431 |
| 2008/0082259 A1* | 4/2008 | Landschaft | B60Q 1/34 701/408 |
| 2009/0069977 A1* | 3/2009 | Markyvech | G01C 21/36 701/41 |
| 2010/0179715 A1 | 7/2010 | Puddy | |
| 2011/0199200 A1* | 8/2011 | Lueke | B60Q 1/346 340/435 |
| 2012/0089300 A1* | 4/2012 | Wolterman | B60Q 1/34 701/36 |
| 2012/0310465 A1* | 12/2012 | Boatright | B60Q 1/346 701/25 |
| 2013/0110347 A1* | 5/2013 | Ge | B60Q 1/346 701/36 |
| 2014/0309855 A1* | 10/2014 | Tran | B60Q 1/38 701/36 |
| 2015/0088358 A1* | 3/2015 | Yopp | B60W 10/04 701/23 |
| 2016/0039428 A1* | 2/2016 | Odate | B60W 50/082 701/23 |
| 2016/0167570 A1* | 6/2016 | Raubvogel | B60K 37/06 701/36 |
| 2016/0185279 A1* | 6/2016 | Zagorski | B60Q 1/34 701/36 |
| 2016/0318515 A1* | 11/2016 | Laur | G05D 1/0061 |
| 2018/0017968 A1* | 1/2018 | Zhu | B60W 50/08 |
| 2018/0113454 A1* | 4/2018 | Emura | B60W 30/182 |
| 2018/0157256 A1* | 6/2018 | Oniwa | B60W 50/14 |

FOREIGN PATENT DOCUMENTS

| | | | | |
|---|---|---|---|---|
| JP | 2006-242905 A | | 9/2006 | |
| JP | 2015-148533 A | | 8/2015 | |
| JP | 2016038846 A | * | 3/2016 | ......... B60W 50/082 |
| WO | WO-2008/120290 A1 | * | 10/2008 | ......... B60W 50/082 |
| WO | 2015/014964 A1 | | 2/2015 | |

OTHER PUBLICATIONS

JPO machine translation of JP 2016-038846 (original JP document published Mar. 22, 2016) (Year: 2016).*

* cited by examiner

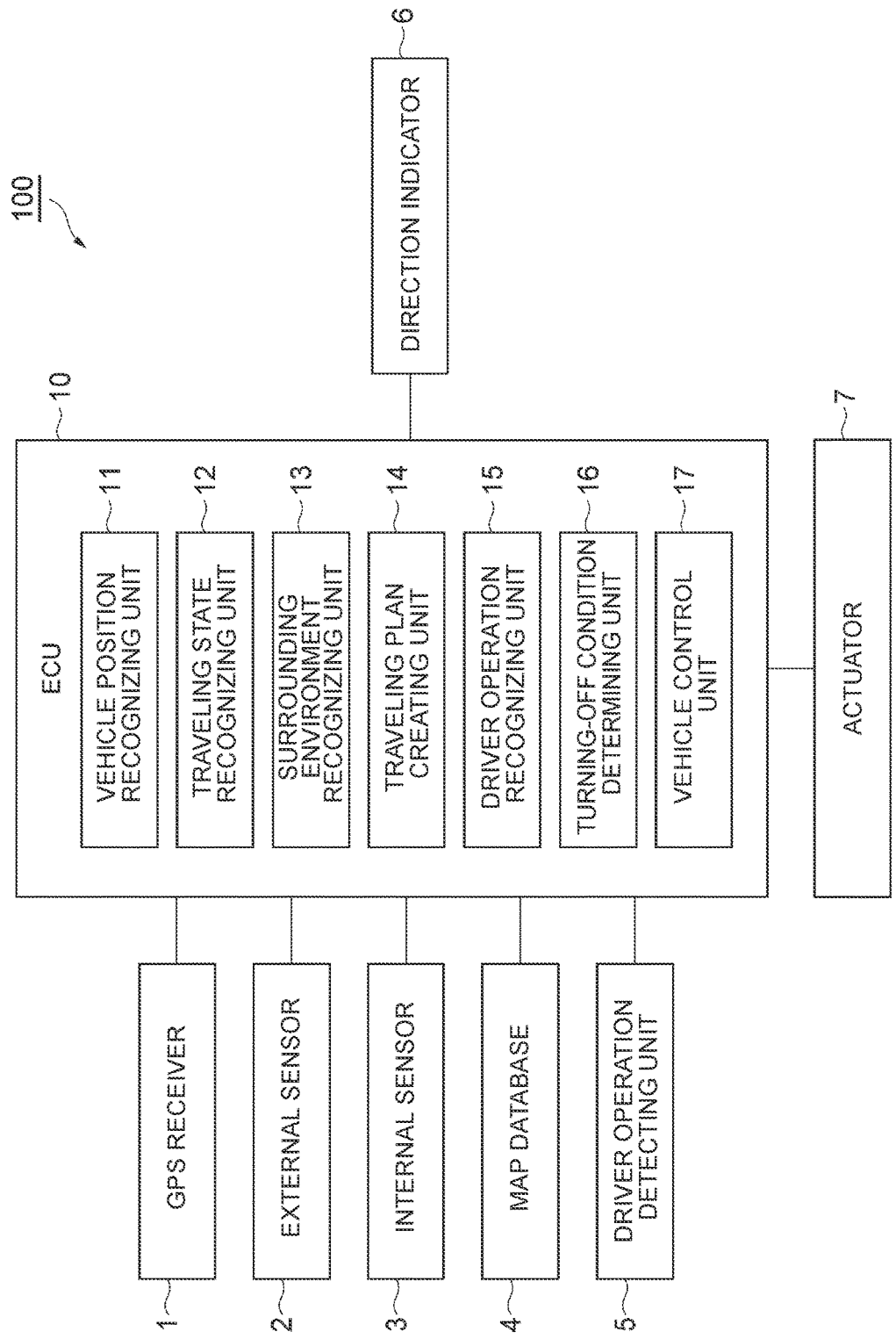

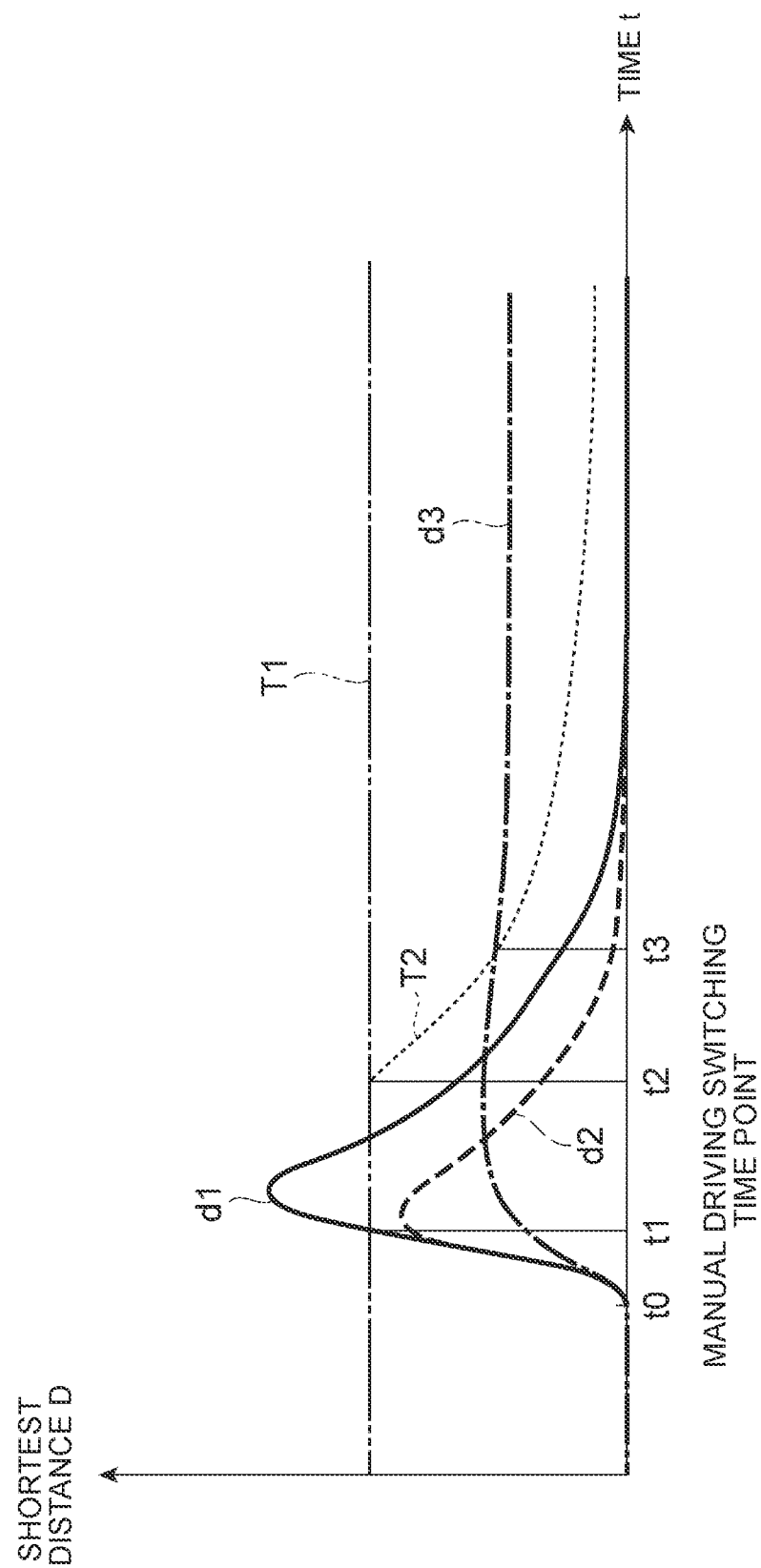

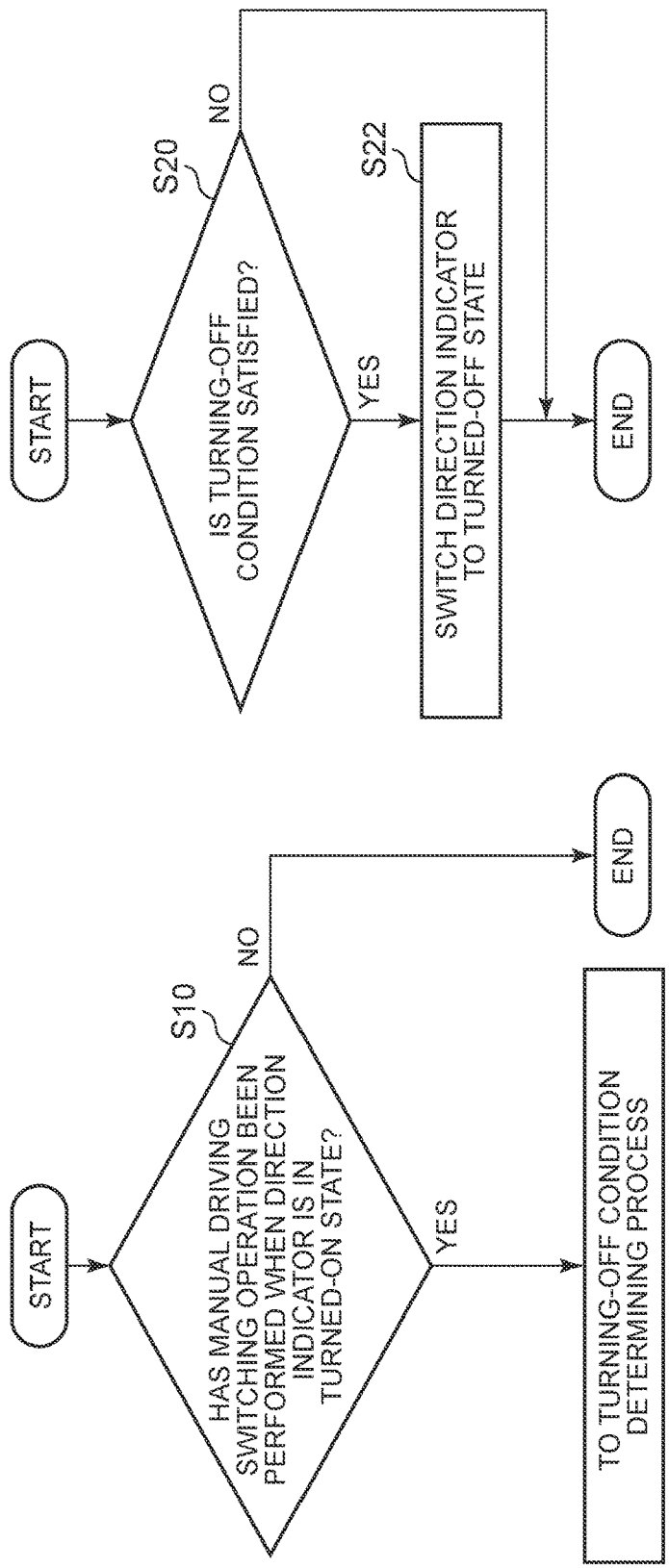

AUTOMATIC DRIVING SYSTEM AND VEHICLE CONTROL METHOD

INCORPORATION BY REFERENCE

The disclosure of Japanese Patent Application No. 2016-177888 filed on Sep. 12, 2016 including the specification, drawings and abstract is incorporated herein by reference in its entirety.

BACKGROUND

1. Technical Field

The present disclosure relates to an automatic driving system and a vehicle control method that control a direction indicator of a vehicle under automatic driving.

2. Description of Related Art

A technique for a device that controls a direction indicator of a vehicle is disclosed in Japanese Patent Application Publication No. 2006-242905 (JP 2006-242905 A). In this publication, a driving support device that detects a target point at which a direction indicator needs to be blinked on a preset guide route and blinks the direction indicator when surrounding conditions of a vehicle satisfy blinking conditions before the target point is described.

SUMMARY

In an automatic driving system that performs automatic driving of a vehicle, when a direction indicator is brought into a turned-on state by automatic driving and a driver ends the automatic driving and performs a manual driving switching operation of switching the automatic driving to manual driving, there is a likelihood that the turned-on state of the direction indicator will be ended and switched to a turned-off state. However, it may not be appropriate that the direction indicator is switched to the turned-off state depending on conditions of the vehicle.

The present disclosure provides an automatic driving system and a vehicle control method that can appropriately control a direction indicator of a vehicle when the direction indicator of the vehicle under automatic driving is in a turned-on state and a driver performs a manual driving switching operation.

According to an aspect of the present disclosure, there is provided an automatic driving system that switches a driving state of a vehicle from automatic driving to manual driving due to a manual driving switching operation performed by a driver during automatic driving of the vehicle. The automatic driving system includes: a turning-off condition determining unit configured to determine whether a preset turning-off condition is satisfied when a direction indicator of a vehicle under automatic driving is in a turned-on state and a manual driving switching operation is performed by a driver; and a vehicle control unit configured to switch a driving state of the vehicle from the automatic driving to manual driving and to maintain the turned-on state of the direction indicator when the direction indicator of the vehicle under the automatic driving is in the turned-on state and the manual driving switching operation has been performed by the driver. The turning-off condition determining unit determines whether the turning-off condition is satisfied based on a position of the vehicle under the manual driving or a traveling state of the vehicle under the manual driving, and the vehicle control unit switches the direction indicator from the turned-on state to the turned-off state when the turning-off condition determining unit has determined that the turning-off condition is satisfied.

According to the automatic driving system according to the aspect of the disclosure, the turned-on state of the direction indicator is maintained when the direction indicator of the vehicle under the automatic driving is in the turned-on state and the manual driving switching operation has been performed by the driver. Accordingly, in comparison with a system of the related art in which the direction indicator is forcibly switched to the turned-off state when the automatic driving is switched to the manual driving, it is possible to prevent the direction indicator from being switched to the turned-off state in a situation in which the turned-on state of the direction indicator is required (for example, a situation in which the vehicle turns to the right or left). According to the automatic driving system, when it is determined that the turning-off condition is satisfied based on the position of the vehicle under the manual driving or the traveling state of the vehicle under the manual driving, the direction indicator is switched from the turned-on state to the turned-off state and thus the direction indicator can be switched from the turned-on state to the turned-off state in a situation in which turning-on of the direction indicator is not necessary such as a case in which the vehicle stops turning to the right or left and goes straight ahead. Accordingly, according to the automatic driving system, it is possible to appropriately control the direction indicator of the vehicle when the direction indicator of the vehicle under the automatic driving is in the turned-on state and the manual driving switching operation is performed by the driver.

In the automatic driving system according to the aspect of the disclosure, the turning-off condition determining unit may determine whether the turning-off condition is satisfied based on a result of comparison between the position of the vehicle under the manual driving and a route of a traveling plan when the automatic driving is maintained. According to this automatic driving system, since it can be recognized that the vehicle under the manual driving departs from a situation in which the turned-on state of the direction indicator based on the traveling plan of the automatic driving is required based on the result of comparison between the position of the vehicle under the manual driving and the route of the traveling plan when the automatic driving is maintained, it is possible to appropriately switch the direction indicator to the turned-off state.

In the automatic driving system according to the aspect of the disclosure, the turning-off condition determining unit may determine that the turning-off condition is satisfied when a shortest distance between the position of the vehicle under the manual driving and the route of the traveling plan when the automatic driving is maintained is equal to or greater than a distance threshold value, and the distance threshold value may decrease with the elapse of time after the driving state of the vehicle is switched from the automatic driving to the manual driving. According to this automatic driving system, since the distance threshold value decreases with the elapse of time after the driving state of the vehicle is switched from the automatic driving to the manual driving, it is determined whether the turning-off condition is satisfied according to the elapse of time and it is possible to appropriately switch the direction indicator to the turned-off state.

In the automatic driving system according to the aspect of the disclosure, the turning-off condition determining unit may determine that the turning-off condition is satisfied when a temporal variation of a shortest distance between the position of the vehicle under the manual driving and the route of the traveling plan when the automatic driving is maintained does not satisfy a preset decreasing condition. According to this automatic driving system, when the temporal variation of the shortest distance between the position of the vehicle during the manual driving and the route of the traveling plan when the automatic driving is maintained does not satisfy a preset decreasing condition, it is recognized that the driver does not have an intention to return to the route of the traveling plan and the vehicle under the manual driving has departed from the situation in which the turned-on state of the direction indicator is required and thus it is possible to appropriately switch the direction indicator to the turned-off state by determining that the turning-off condition is satisfied.

In the automatic driving system according to the aspect of the disclosure, the turning-off condition determining unit may determine whether the turning-off condition is satisfied based on a result of comparison between a traveling state of the vehicle under the manual driving and a traveling state of the traveling plan when the automatic driving is maintained. According to this automatic driving system, since it can be recognized that the vehicle under the manual driving has departed from a situation in which the turned-on state of the direction indicator is required based on the traveling plan of the automatic driving is required based on the result of comparison between the traveling state of the vehicle under the manual driving and the traveling state of the traveling plan when the automatic driving is maintained, it is possible to appropriately switch the direction indicator to the turned-off state.

In the automatic driving system according to the aspect of the disclosure, the turning-off condition determining unit may determine that the turning-off condition is satisfied when a difference between a steering angle of the vehicle under the manual driving and a steering angle of the traveling plan when the automatic driving is maintained is equal to or greater than a steering angle threshold value, and the steering angle threshold value may decrease with the elapse of time after the driving state of the vehicle is switched from the automatic driving to the manual driving. According to this automatic driving system, since the steering angle threshold value decreases with the elapse of time after the driving state of the vehicle is switched from the automatic driving to the manual driving, it is determined whether the turning-off condition is satisfied according to the elapse of time and it is possible to appropriately switch the direction indicator to the turned-off state.

In the automatic driving system according to the aspect of the disclosure, the turning-off condition determining unit may determine that the turning-off condition is satisfied when a difference between a vehicle speed of the vehicle under the manual driving and a vehicle speed of the traveling plan when the automatic driving is maintained is equal to or greater than a vehicle speed threshold value, and the vehicle speed threshold value may decrease with the elapse of time after the driving state of the vehicle is switched from the automatic driving to the manual driving. According to this automatic driving system, since the vehicle speed threshold value decreases with the elapse of time after the driving state of the vehicle is switched from the automatic driving to the manual driving, it is determined whether the turning-off condition is satisfied according to the elapse of time and it is possible to appropriately switch the direction indicator to the turned-off state.

According to a second aspect of the present disclosure, there is provided a vehicle control method. The vehicle control method includes: causing an electronic control unit to perform automatic traveling control of causing a vehicle to travel automatically and to turn on and off a direction indicator of the vehicle with performing of the automatic traveling control; causing the electronic control unit to switch driving control of the vehicle from the automatic traveling control to manual traveling control when a predetermined operational input from a user is detected during performing of the automatic traveling control; causing the electronic control unit to determine whether a preset turning-off condition of the direction indicator is satisfied based on a traveling state of the vehicle when the driving control of the vehicle is switched from the automatic traveling control to the manual traveling control and the direction indicator is controlled such that the direction indicator is turned on; and causing the electronic control unit to control the direction indicator such that the direction indicator is turned on when the turning-off condition is not satisfied and the direction indicator is turned off when the turning-off condition is satisfied.

As described above, according to the automatic driving system and the vehicle control method according to the aspects of the present disclosure, it is possible to appropriately control a direction indicator of a vehicle when the direction indicator of the vehicle under automatic driving is in a turned-on state and a driver performs a manual driving switching operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a block diagram illustrating an automatic driving system according to an embodiment;

FIG. 3 is a graph illustrating a temporal variation of a shortest distance between a position of the vehicle under the manual driving and a route of a traveling plan when the automatic driving is maintained;

FIG. 4A is a flowchart illustrating determination of start of a turning-off condition determining process;

FIG. 4B is a flowchart illustrating the turning-off condition determining process;

DETAILED DESCRIPTION OF EMBODIMENTS

Figure 2A:
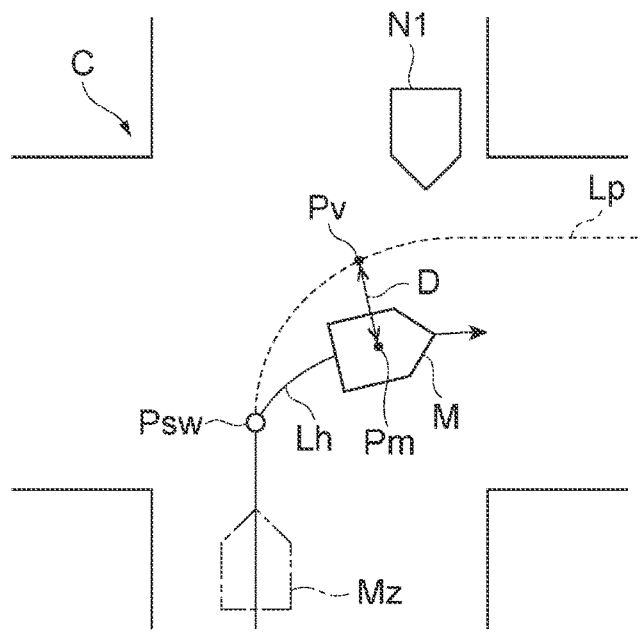
FIG. 2A is a plan view illustrating a situation in which automatic driving is switched to manual driving when a vehicle turns to the right under automatic driving.

Hereinafter, an embodiment of the disclosure will be described with reference to the accompanying drawings.

FIG. 1 is a block diagram illustrating an automatic driving system according to an embodiment. The automatic driving system 100 according to this embodiment illustrated in FIG. 1 is mounted in a vehicle such as an automobile and performs automatic driving of causing the vehicle to travel automatically. Automatic driving is vehicle control of causing the vehicle to travel to a destination without a driver's operation. The automatic driving system 100 switches a driving state of the vehicle from automatic driving to manual driving when a preset manual driving switching operation is performed by a driver. Manual driving is a driving state in which the vehicle travels due to a driver's driving operation.

The automatic driving system 100 also controls a direction indicator of the vehicle under automatic driving. The automatic driving system 100 maintains a turned-on state of the direction indicator when the direction indicator is in the turned-on state and the driving state of the vehicle is switched from automatic driving to manual driving. The automatic driving system 100 switches the direction indicator from the turned-on state to a turned-off state when a preset turning-off condition is satisfied. The turning-off condition will be described later in detail. In this embodiment, the turned-on state of the direction indicator does not include a turned-on state of the direction indicator as a hazard lamp.

[Configuration of automatic driving system] As illustrated in FIG. 1, the automatic driving system 100 includes an electronic control unit (ECU) 10 that comprehensively controls the vehicle under automatic driving. The ECU 10 is an electronic control unit that includes a central processing unit (CPU), a read only memory (ROM), a random access memory (RAM), and a controller area network (CAN) communication circuit. In the ECU 10, various functions are embodied, for example, by loading a program stored in the ROM into the RAM and causing the CPU to execute the program loaded into the RAM. The ECU 10 may include a plurality of electronic control units.

The ECU 10 is connected to a global positioning system (GPS) receiver 1, an external sensor 2, an internal sensor 3, a map database 4, a driver operation detecting unit 5, a direction indicator driving unit 6, and an actuator 7.

The GPS receiver 1 measures a position of a vehicle (for example, the latitude and longitude of the vehicle) by receiving signals from three or more GPS satellites. The GPS receiver 1 transmits information on the measured position of the vehicle to the ECU 10.

The external sensor 2 is a detection device that detects surrounding conditions of the vehicle. The external sensor 2 includes at least one of a camera and a radar sensor.

The camera is an imaging device that images external conditions of the vehicle. The camera is disposed on the back of a front windshield of the vehicle. The camera transmits imaging information on the external conditions of the vehicle to the ECU 10. The camera may be a monocular camera or a stereoscopic camera. The stereoscopic camera includes two imaging units that are arranged to reproduce binocular parallax. The imaging information of the stereoscopic camera includes information in a depth direction.

The radar sensor detects an obstacle around the vehicle M using radio waves (for example, radio waves of 1 to 10 millimeters) or light. The radar sensor detects an obstacle by transmitting radio waves or light to the surroundings of the vehicle M and receiving radio waves or light reflected by the obstacle. The radar sensor transmits information on the detected obstacle to the ECU 10. Examples of the obstacle include mobile obstacles such as a pedestrian, a bicycle, and another vehicle in addition to fixed obstacles such as a guard rail and a building.

The internal sensor 3 is a detection device that detects a traveling state of the vehicle. The internal sensor 3 includes a vehicle speed sensor, an acceleration sensor, and a yaw rate sensor. The vehicle speed sensor is a detector that detects a speed of the vehicle. For example, a wheel speed sensor that is disposed in vehicle wheels of the vehicle or a drive shaft rotating along with the vehicle wheels and that detects a rotation speed of the wheels is used as the vehicle speed sensor. The vehicle speed sensor transmits information on the detected vehicle speed (wheel speed information) to the ECU 10.

The acceleration sensor is a detector that detects an acceleration of the vehicle. The acceleration sensor includes a longitudinal acceleration sensor that detects an acceleration in a longitudinal direction of the vehicle and a lateral acceleration sensor that detects a lateral acceleration of the vehicle. The acceleration sensor transmits, for example, acceleration information of the vehicle to the ECU 10. The yaw rate sensor is a detector that detects a yaw rate (a rotational angular velocity) about a vertical axis at center of gravity of the vehicle. For example, a gyro sensor can be used as the yaw rate sensor. The yaw rate sensor transmits information on the detected yaw rate of the vehicle to the ECU 10.

The map database 4 is a database that stores map information. The map database 4 is formed, for example, in a hard disk drive (HDD) mounted in the vehicle. Map information includes position information of roads, shape information of roads (for example, curved parts, types of straight parts, and curvatures of the curved portions), position information of crossings and junctions, and position information of buildings. The map database 4 may be stored in a computer of a facility such as a management center that can communicate with the vehicle.

The driver operation detecting unit 5 is a device that detects a driver's operation on the vehicle. The driver operation detecting unit 5 includes a direction indicator lever sensor, a steering sensor, an accelerator pedal sensor, and a brake pedal sensor. The direction indicator lever sensor is a sensor that is disposed in a direction indicator lever of the vehicle and that detects a driver's operation on the direction indicator lever of the vehicle. The steering sensor is disposed in a steering shaft of the vehicle and detects a steering angle by which a driver turns a steering wheel. The steering sensor may detect a steering torque in addition to the steering angle. The accelerator pedal sensor is disposed in a shaft portion of an accelerator pedal and detects a depression force or a depression amount on the accelerator pedal (a position of the accelerator pedal) due to a driver. The brake pedal sensor is disposed in a shaft portion of a brake pedal and detects a depression force or a depression amount on the brake pedal (a position of the brake pedal) due to a driver. The driver operation detecting unit 5 transmits the detected operation information of a driver to the ECU 10.

The direction indicator driving unit 6 is a device that switches the direction indicator of the vehicle between a turned-on state and a turned-off state. The direction indicator driving unit 6 can be constituted, for example, by an electronic control unit including a drive circuit including a microprocessor, a transistor, and a relay and a communication device. The direction indicator driving unit 6 switches the direction indicator between the turned-on state and the turned-off state based on a control signal from the ECU 10.

The actuator 7 is a device that performs traveling control of the vehicle. The actuator 7 includes at least a throttle actuator, a brake actuator, and a steering actuator. The throttle actuator controls an amount of air supplied to an engine (a throttle opening level) in accordance with a control signal from the ECU 10 and controls a driving force of the vehicle. When the vehicle is a hybrid vehicle, a control signal from the ECU 10 is input to a motor as a power source and the driving force is controlled in addition to the amount of air supplied to the engine. When the vehicle is an electric vehicle, a control signal from the ECU 10 is input to a motor as a power source and the driving force is controlled. In this case, the motor as a power source constitutes the actuator 7.

The brake actuator controls a brake system in accordance with a control signal from the ECU 10 and controls a braking force which is applied to the vehicle wheels of the vehicle. For example, a hydraulic brake system can be used as the brake system. The steering actuator controls driving of an assist motor that controls a steering torque in an electric power steering system in accordance with a control signal from the ECU 10. Accordingly, the steering actuator controls the steering torque of the vehicle.

A functional configuration of the ECU 10 will be described below. The ECU 10 includes a vehicle position recognizing unit 11, a traveling state recognizing unit 12, a surrounding environment recognizing unit 13, a traveling plan creating unit 14, a driver operation recognizing unit 15, a turning-off condition determining unit 16, and a vehicle control unit 17. A part of the functions of the ECU 10 which will be described below may be embodied by a computer of a facility such as a management center that can communicate with the vehicle.

The vehicle position recognizing unit 11 recognizes a position of the vehicle on a map based on the position information of the GPS receiver 1 and the map information of the map database 4. The vehicle position recognizing unit 11 may recognize the position of the vehicle by a simultaneous localization and mapping (SLAM) technique using position information of fixed obstacles such as electric poles included in the map information of the map database 4 and the detection result of the external sensor 2.

The traveling state recognizing unit 12 recognizes a traveling state of the vehicle based on the detection result of the internal sensor 3. The traveling state includes a vehicle speed of the vehicle, an acceleration of the vehicle, and a yaw rate of the vehicle. Specifically, the traveling state recognizing unit 12 recognizes the vehicle speed of the vehicle based on the vehicle speed information from the vehicle speed sensor. The traveling state recognizing unit 12 recognizes a direction of the vehicle based on the yaw rate information from the yaw rate sensor.

The surrounding environment recognizing unit 13 recognizes a surrounding environment of the vehicle based on the detection result of the external sensor 2. The surrounding environment includes positions of obstacles with respect to the vehicle, relative speeds of the obstacles with respect to the vehicle, and moving directions of the obstacles with respect to the vehicle. The surrounding environment recognizing unit 13 recognizes the surrounding environment of the vehicle using a known technique based on captured images of the camera and obstacle information from the radar sensor.

The traveling plan creating unit 14 creates a traveling plan of the vehicle based on a preset target route, the map information of the map database 4, the position of the vehicle on the map recognized by the vehicle position recognizing unit 11, the traveling state of the vehicle recognized by the traveling state recognizing unit 12, and the surrounding environment recognized by the surrounding environment recognizing unit 13. The preset target route is a route from a current location of the vehicle on the map to a destination set by a driver or the like. The preset target route is set using a known technique. The preset target route may be set by a known navigation system.

The traveling plan includes a control target value of the vehicle corresponding to the position of the vehicle on the target route. The position on the target route corresponds to a set progress position which is set at predetermined intervals (for example, 1 m) in an extending direction of the target route. The control target value is a value (for example, a target vehicle speed or a target steering angle) which is a control target of the vehicle in the traveling plan. The control target value is set in correlation with each set progress position on the target route. By determining the set progress position and the control target value, a route of the traveling plan (a route on which the vehicle under automatic driving travels) is determined. The route of the traveling plan is set, for example, to pass through a central position of a lane (a central position in the width direction of the lane) included in the target route. The route of the traveling plan is set using a known technique. The traveling plan creating unit 14 creates a traveling plan including a route by setting the control target value for each set progress position.

The traveling plan creating unit 14 creates a traveling plan including control of the direction indicator. When the vehicle turns to the right or left at a crossing, the traveling plan creating unit 14 sets control of switching the direction indicator to the turned-on state in correlation with the set progress position corresponding to a start position of the right or left turn. When the vehicle departs from the crossing after turning to the right or left, the traveling plan creating unit 14 sets control of switching the direction indicator to the turned-off state in correlation with the set progress position corresponding to the position of departing from the crossing. The traveling plan creating unit 14 sets the turned-on state or the turned-off state of the direction indicator in correlation with the set progress position using a known technique.

The driver operation recognizing unit 15 recognizes a driver's operation on the direction indicator lever of the vehicle, a steering angle of the vehicle, and operations on the accelerator pedal and the brake pedal of the vehicle based on the information on the driver's operation detected by the driver operation detecting unit 5. When a cancel button of automatic driving is provided in the vehicle, the driver operation recognizing unit 15 recognizes a driver's operation on the cancel button.

The driver operation recognizing unit 15 recognizes a driver's manual driving switching operation based on the information of the operation of the driver detected by the driver operation detecting unit 5. The manual driving switching operation is an operation for switching the driving state of the vehicle from automatic driving to manual driving, which is performed by a driver. Examples of the manual driving switching operation include an operation of changing the steering angle to be equal to or greater than a predetermined value by allowing a driver to turn a steering wheel, an operation of allowing a driver to depress the brake pedal or the accelerator pedal to achieve a depression amount equal to or greater than a predetermined amount, and an operation of allowing a driver to turn on the cancel button of automatic driving. The manual driving switching operation may include an operation of allowing a driver to apply a steering torque equal to or greater than a predetermined value to the steering wheel of the vehicle, or may include an operation of allowing a driver to apply a depression force equal to or greater than a predetermined value to the brake pedal or the accelerator pedal.

When the direction indicator of the vehicle under automatic driving is in the turned-on state, the turning-off condition determining unit 16 determines whether the manual driving switching operation has been performed by a driver. The turning-off condition determining unit 16 determines whether the manual driving switching operation has been performed based on the recognition result of the driver operation recognizing unit 15.

When the direction indicator of the vehicle under automatic driving is in the turned-on state and it is determined that the manual driving switching operation has been performed by a driver, the turning-off condition determining unit 16 determines whether a preset turning-off condition is satisfied. The turning-off condition is a condition for switching the direction indicator from the turned-on state to the turned-off state.

The turning-off condition determining unit 16 determines whether the turning-off condition is satisfied based on the position of the vehicle on the map recognized by the vehicle position recognizing unit 11, the traveling state of the vehicle recognized by the traveling state recognizing unit 12, and the traveling plan created by the traveling plan creating unit 14. Detailed determination of the turning-off condition will be described later.

The vehicle control unit 17 performs automatic driving of the vehicle based on the position of the vehicle on the map recognized by the vehicle position recognizing unit 11, the traveling state of the vehicle recognized by the traveling state recognizing unit 12, the surrounding environment recognized by the surrounding environment recognizing unit 13, and the traveling plan created by the traveling plan creating unit 14. The vehicle control unit 17 performs the automatic driving by causing the vehicle to travel along the route of the traveling plan. The vehicle control unit 17 performs automatic driving using a known technique. The vehicle control unit 17 switches the direction indicator to the turned-on state or the turned-off state based on the position of the vehicle on the map and the traveling plan.

When the manual driving switching operation of a driver is recognized by the driver operation recognizing unit 15, the vehicle control unit 17 switches the driving state of the vehicle from the automatic driving to the manual driving. When the direction indicator of the vehicle under automatic driving is in the turned-on state and the manual driving switching operation has been performed by a driver, the vehicle control unit 17 maintains the turned-on state of the direction indicator. Even when the driving state of the vehicle is switched from the automatic driving to the manual driving, the vehicle control unit 17 maintains the turned-on state of the direction indicator which has been in the turned-on state during the automatic driving.

When the turning-off condition determining unit 16 determines that the turning-off condition has been satisfied, the vehicle control unit 17 switches the turned-on state of the direction indicator, which has been maintained at the time of switching from the automatic driving to the manual driving, to the turned-off state. The vehicle control unit 17 switches the direction indicator from the turned-on state to the turned-off state by transmitting a control signal to the direction indicator driving unit 6.

Determination of the turning-off condition in the turning-off condition determining unit 16 will be described below. FIG. 2A is a plan view illustrating a situation in which the driving state of the vehicle is switched to the manual driving when the vehicle under the automatic driving turns to the right. In FIG. 2A, a crossing C, a vehicle M which has been switched from automatic driving to manual driving, an oncoming vehicle N1, a route Lp of the traveling plan of the automatic driving, a manual driving switching point Psw, a locus Lh of the vehicle M under manual driving, a position Pm of the vehicle M under manual driving, a shortest distance position Pv which is closest to the position Pm of the vehicle M on the route Lp of the traveling plan, and a shortest distance D which is a distance between the position Pm of the vehicle M and the shortest distance position Pv on the route Lp are illustrated. Mz denotes the vehicle M in the past under automatic driving in which the right direction indicator is in the turned-on state to turn to the right at the crossing C along the route Lp of the traveling plan of the automatic driving. The shortest distance D is a shortest distance between the position Pm of the vehicle M under manual driving and the route Lp.

In the situation illustrated in FIG. 2A, a driver switches the driving state of the vehicle M to manual driving at the manual driving switching point Psw and turns to the right with a distance from the oncoming vehicle N1 by manual driving, in order to avoid the vehicle M approaching the oncoming vehicle N1 protruding and stopping in the crossing C.

In the situation illustrated in FIG. 2A, the turning-off condition determining unit 16 determines whether the turning-off condition is satisfied based on a result of comparison between the position Pm of the vehicle M under manual driving and the route Lp of the traveling plan when the automatic driving should have been maintained.

Specifically, when the shortest distance D between the position Pm of the vehicle M under manual driving and the route Lp of the traveling plan when the automatic driving should have been maintained is equal to or greater than a distance threshold value, the turning-off condition determining unit 16 determines that the turning-off condition is satisfied. In the situation illustrated in FIG. 2A, since the shortest distance D is not equal to or greater than the distance threshold value, the turning-off condition determining unit 16 determines that the turning-off condition is not satisfied, and maintains the turned-on state of the direction indicator. The distance threshold value is a preset value. The distance threshold value decreases with the elapse of time after the driving state of the vehicle M is switched from automatic driving to manual driving.

FIG. 3 is a graph illustrating a temporal variation of the shortest distance between the position of the vehicle under manual driving and the route of the traveling plan when the automatic driving is maintained. In FIG. 3, the vertical axis represents the shortest distance D and the horizontal axis represents time t. In FIG. 3, a first distance threshold value T1 which is a fixed value, a second distance threshold value T2 which decreases with the elapse of time, and a manual driving switching time point t0 which is a time point at which the driving state of the vehicle M is switched from automatic driving to manual driving are illustrated. At the manual driving switching time point t0, the direction indicator of the vehicle M is in the turned-on state.

The second distance threshold value T2 is set, for example, to a time point is after a predetermined time passes from the manual driving switching time point t0. The second distance threshold value T2 may be already set at the manual driving switching time point t0. In this case, the time point is refers to a time point at which the second distance threshold value t2 becomes less than the first distance threshold value T1. The second distance threshold value T2 decreases with the elapse of time, but does not become zero. That is, the second distance threshold value T2 has a constant minimum value.

In FIG. 3, d1 to d3 denotes examples of the temporal variation of the shortest distance D. Here, d1 denotes an example in which the shortest distance D increases temporarily after switching to the manual driving and then decreases (in which the vehicle M departs temporarily greatly from the route Lp and then the vehicle M approaches the route Lp) using a solid line. The shortest distance D in the solid line d1 is equal to or greater than the first distance threshold value T1 at time point t1. Time point t1 corresponds to a time point at which the turning-off condition determining unit 16 determines that the shortest distance D is equal to or greater than the first distance threshold value T1 (a time point at which it is determined that the turning-off condition is satisfied).

In the example denoted by the solid line d1, in the vehicle M, the turned-on state of the direction indicator is maintained from the manual driving switching time point t0 to time point t1. Thereafter, in the vehicle M, at time point t1, the turning-off condition determining unit 16 determines that the turning-off condition is satisfied and the vehicle control unit 17 switches the direction indicator from the turned-on state to the turned-off state.

d2 denotes an example in which the shortest distance D increases slightly temporarily after switching to the manual driving and then decreases (in which the vehicle M departs temporarily slightly from the route Lp and then the vehicle M travels along the route Lp) using a dotted line. The shortest distance D in the dotted line d2 is not equal to or greater than the first distance threshold value T1 and is not equal to or than the second distance threshold value T2. That is, in the example denoted by the dotted line d2, since the vehicle M under manual driving travels along the route Lp of the traveling plane under automatic driving, the turning-off condition based on the shortest distance D is not satisfied. Accordingly, in the example denoted by the dotted line d2, the vehicle M maintains the turned-on state of the direction indicator until it is determined that the turning-off condition is satisfied by another aspect.

d3 denotes an example in which the shortest distance D increases to a predetermined value after switching to the manual driving and then the state is maintained (in which the vehicle M departs slightly from the route Lp of the traveling plan and then the vehicle M travels with a constant distance from the route Lp) using a one-dot chained line. The shortest distance D in the one-dot chained line d3 is equal to or greater than the second distance threshold value T2 at time point t3. Time point t3 corresponds to a time point at which the turning-off condition determining unit 16 determines that the shortest distance D is equal to or greater than the second distance threshold value T2 (a time point at which it is determined that the turning-off condition is satisfied).

In the example denoted by the one-dot chained line d3, in the vehicle M, the turned-on state of the direction indicator is maintained from the manual driving switching time point t0 to time point t3. Thereafter, in the vehicle M, at time point t3, the turning-off condition determining unit 16 determines that the turning-off condition is satisfied and the vehicle control unit 17 switches the direction indicator from the turned-on state to the turned-off state.

Figure 2B:
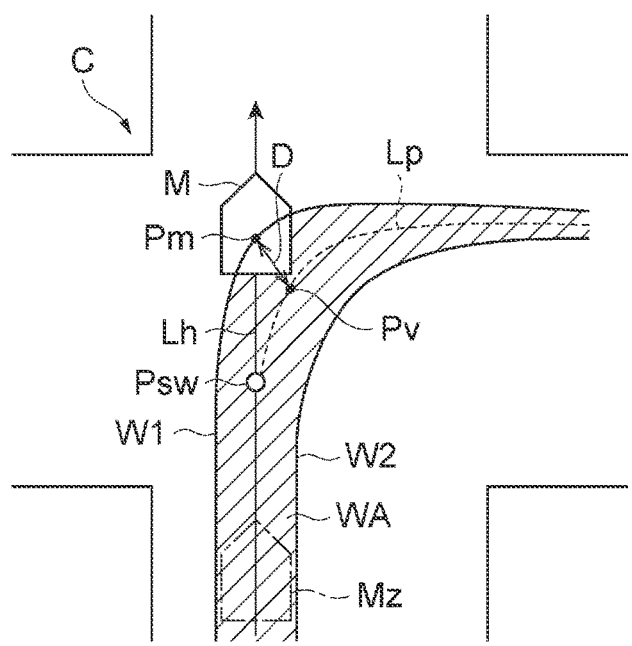
FIG. 2B is a plan view illustrating a situation in which the vehicle switched to the manual driving in FIG. 2A goes straight ahead.

FIG. 2B is a plan view illustrating a situation in which the vehicle switched to the manual driving in FIG. 2A goes straight ahead. In FIG. 2B, an allowable range (a range in which the turned-on state of the direction indicator is maintained) WA in which it is determined that the turning-off condition is not satisfied is illustrated. The allowable range WA, the left boundary of the vehicle M is indicated by W1 and the right boundary of the vehicle M is indicated by W2. The allowable range WA corresponds to a range in which the shortest distance D between the position Pm of the vehicle M under manual driving and the route Lp of the traveling plan when the automatic driving should have been maintained is not equal to or than a distance threshold value. The distance threshold value decreases with the elapse of time. In FIG. 2B, the allowable range WA is illustrated on the assumption that the vehicle speed of the vehicle M is constant.

In FIG. 2B, a driver of the vehicle M wants to go straight ahead and switches the driving state from automatic driving in which turning to the right is scheduled to manual driving. In the situation illustrated in FIG. 2B, the position Pm of the vehicle M under manual driving reaches the boundary W1 of the allowable range WA. The turning-off condition determining unit 16 determines that the turning-off condition is satisfied because the shortest distance D between the position Pm of the vehicle M under manual driving and the route Lp of the traveling plan when the automatic driving should have been maintained is equal to or greater than the distance threshold value. The vehicle control unit 17 switches the direction indicator from the turned-on state to the turned-off state.

An example in which the turning-off condition is determined has been described above, the determination of the turning-off condition is not limited to the example. The turning-off condition determining unit 16 determines that the turning-off condition is satisfied when a driver performs an operation of switching the direction indicator lever (an operation of switching the direction indicator to the turned-off state).

The turning-off condition determining unit 16 determines that the turning-off condition is satisfied when the vehicle M under manual driving reaches a turning-off time at which switching of the direction indicator to the turned-off state has been scheduled in the traveling plan when the automatic driving should have been maintained. The turning-off condition determining unit 16 determines whether the turning-off time at which switching of the direction indicator to the turned-off state has been scheduled in the traveling plan when the automatic driving should have been maintained arrives based on the lapse of time or the traveling distance of the vehicle M during manual driving. For example, when the direction indicator is scheduled to be switched to the turned-off state at a point at which the vehicle travels 100 m along the route Lp of the traveling plan from the manual driving switching point Psw and the vehicle M travels 100 m under manual driving from the manual driving switching point Psw, the turning-off condition determining unit 16 determines that the turning-off condition is satisfied because the vehicle M reaches the turning-off time. Another example of the determination of the turning-off condition will be described later.

[Process of determining turning-off condition of direction indicator in automatic driving system] A flow of a turning-off condition determining process of the direction indicator in the automatic driving system 100 according to this embodiment will be described below.

<Determination of start of turning-off condition determining process> Determination of start of the turning-off condition determining process will be described below. FIG. 4A is a flowchart illustrating the determination of start of the turning-off condition determining process. The flowchart illustrated in FIG. 4A is performed while the vehicle M travels under automatic driving.

As illustrated in FIG. 4A, in S10, the ECU 10 of the automatic driving system 100 causes the turning-off condition determining unit 16 to determine whether the direction indicator of the vehicle M under automatic driving is in the turned-on state and the manual driving switching operation has been performed by a driver. The turning-off condition determining unit 16 determines whether the manual driving switching operation has been performed based on the recognition result of the driver operation recognizing unit 15.

When it is not determined that the direction indicator of the vehicle M under automatic driving is in the turned-on state and the manual driving switching operation has been performed (NO in S10), the ECU 10 ends the process flow. Thereafter, the ECU 10 performs the determination of S10 again after a predetermined time elapses. When it is determined that the direction indicator of the vehicle M under automatic driving is in the turned-on state and the manual driving switching operation has been performed (YES in S10), the ECU 10 starts the turning-off condition determining process.

<Turning-off condition determining process> FIG. 4B is a flowchart illustrating the turning-off condition determining process. The flowchart illustrated in FIG. 4B is performed when the turning-off condition determining process is started in the flowchart illustrated in FIG. 4A.

As illustrated in FIG. 4B, in S20, the ECU 10 causes the turning-off condition determining unit 16 to determine whether the turning-off condition is satisfied. The turning-off condition determining unit 16 determines whether the turning-off condition is satisfied based on the position of the vehicle on the map recognized by the vehicle position recognizing unit 11, the traveling state of the vehicle recognized by the traveling state recognizing unit 12, and the traveling plan created by the traveling plan creating unit 14.

When it is not determined that the turning-off condition is satisfied (NO in S20), the ECU 10 ends the process flow. Thereafter, the ECU 10 performs the determination of S20 again after a predetermined time elapses. When it is determined that the turning-off condition is satisfied (YES in S20), the ECU 10 performs S22.

In S22, the ECU 10 causes the vehicle control unit 17 to switch the direction indicator from the turned-on state to the turned-off state. The vehicle control unit 17 switches the direction indicator from the turned-on state to the turned-off state by transmitting a control signal to the direction indicator driving unit 6.

<First example in which turning-off condition is satisfied> A first example in which the turning-off condition is satisfied will be described below. The first example corresponds to the above-described details. In the first example, the turning-off condition determining unit 16 determines whether the turning-off condition is satisfied based on the result of comparison between the position of the vehicle under manual driving and the route of the traveling plan when the automatic driving should have been maintained. When the shortest distance D between the position Pm of the vehicle M under manual driving and the route Lp of the traveling plan when the automatic driving should have been maintained is equal to or greater than the distance threshold value, the turning-off condition determining unit 16 determines that the turning-off condition is satisfied.

Figure 5A:
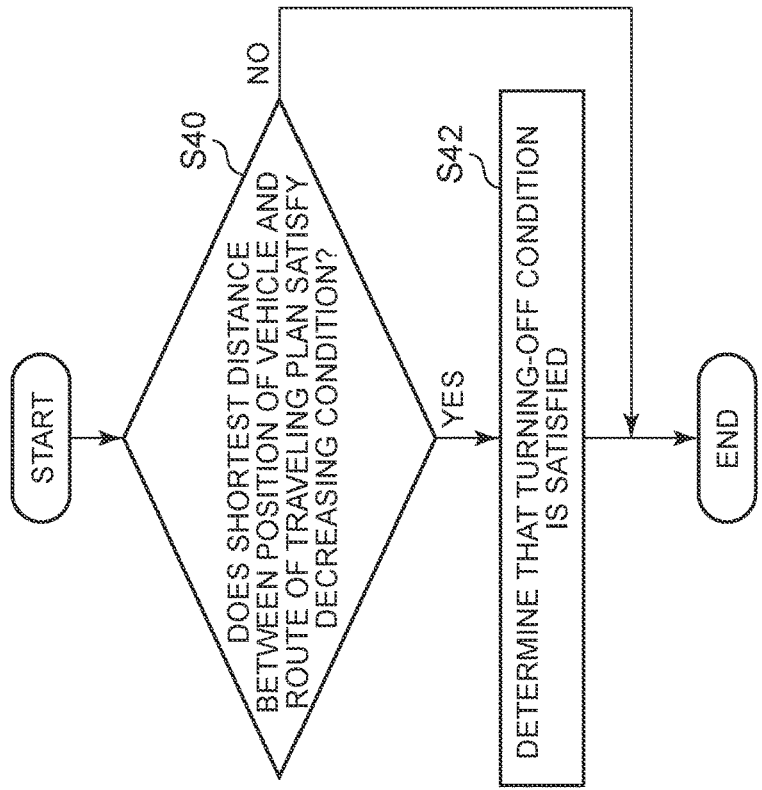
FIG. 5A is a flowchart illustrating a first example in which a turning-off condition is satisfied.

FIG. 5A is a flowchart illustrating the first example in which it is determined that the turning-off condition is satisfied. As illustrated in FIG. 5A, in S30, the ECU 10 causes the turning-off condition determining unit 16 to determine whether the shortest distance D between the position Pm of the vehicle M under manual driving and the route Lp of the traveling plan when the automatic driving should have been maintained is equal to or greater than the distance threshold value. The turning-off condition determining unit 16 determines whether the shortest distance D is equal to or greater than the distance threshold value based on the position of the vehicle M on the map and the route of the traveling plan. The distance threshold value decreases with the elapse of time after the driving state of the vehicle M is switched from automatic driving to manual driving.

When it is not determined that the shortest distance D is equal to or greater than the distance threshold value (NO in S30), the ECU 10 ends the process flow. Thereafter, the ECU 10 performs the determination of S30 again after a predetermined time elapses. When it is determined that the turning-off condition is satisfied by another flowchart, the flow of the flowchart illustrated in FIG. 5A is ended en route. When it is determined that the shortest distance D is equal to or greater than the distance threshold value (YES in S30), the ECU 10 performs S32.

In S32, the ECU 10 causes the turning-off condition determining unit 16 to determine that the turning-off condition is satisfied. Thereafter, the ECU 10 switches the direction indicator from the turned-on state to the turned-off state in S22 in FIG. 4B.

<Second example in which turning-off condition is satisfied> A second example in which the turning-off condition is satisfied will be described below. In the second example, similarly to the first example, the turning-off condition determining unit 16 determines whether the turning-off condition is satisfied based on the result of comparison between the position of the vehicle M under manual driving and the route of the traveling plan when the automatic driving should have been maintained. The second example is different from the first example, in that when a temporal variation of the shortest distance D between the position Pm of the vehicle M under manual driving and the route Lp of the traveling plan when the automatic driving should have been maintained satisfies a preset decreasing condition, the turning-off condition determining unit 16 determines that the turning-off condition is not satisfied.

The decreasing condition is a condition for determining whether the shortest distance D decreases with the elapse of time. When the shortest distance D decreases with the elapse of time, the vehicle M under manual driving travels to return to the route Lp of the traveling plan of the automatic driving and thus it is conceived that it is appropriate to maintain the turned-on state of the direction indicator based on the traveling plan.

Figure 5B:
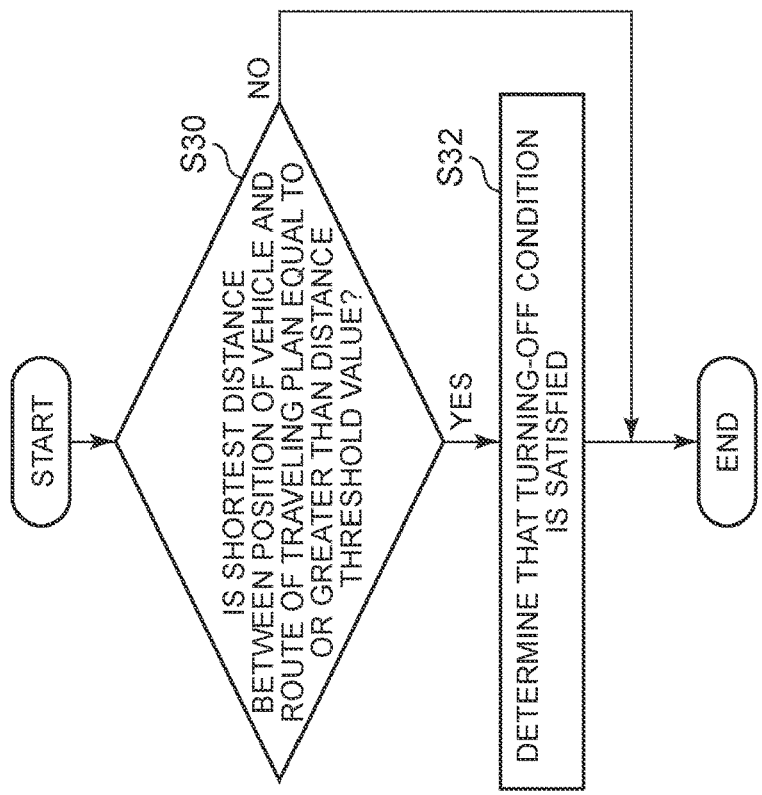
FIG. 5B is a flowchart illustrating a second example in which a turning-off condition is satisfied.

FIG. 5B is a flowchart illustrating the second example in which it is determined that the turning-off condition is satisfied. As illustrated in FIG. 5B, in S40, the ECU 10 causes the turning-off condition determining unit 16 to determine whether the temporal variation of the shortest distance D between the position Pm of the vehicle M under manual driving and the route Lp of the traveling plan when the automatic driving should have been maintained satisfies the preset decreasing condition.

The turning-off condition determining unit 16 calculates the shortest distance D at predetermined intervals multiple times when a margin time elapses after the driving state of the vehicle M is switched to manual driving. When the later-calculated shortest distance D is a smaller value, the turning-off condition determining unit 16 determines that the decreasing condition is satisfied. When the time derivative of the shortest distance D has a negative value after the margin time elapses, the turning-off condition determining unit 16 may determine that an increasing condition is satisfied.

When it is determined that the decreasing condition is satisfied (YES in S40), the ECU 10 ends the process flow. Thereafter, the ECU 10 performs the determination of S40 again after a predetermined time elapses. When it is determined that the turning-off condition is satisfied by another flowchart, the ECU 10 ends the flow of the flowchart illustrated in FIG. 5B en route. When it is determined that the decreasing condition is not satisfied (NO in S40), the ECU 10 performs S42.

In S42, the ECU 10 causes the turning-off condition determining unit 16 to determine that the turning-off condition is satisfied. Thereafter, the ECU 10 switches the direction indicator from the turned-on state to the turned-off state in S22 illustrated in FIG. 4B.

<Third example in which turning-off condition is satisfied> A third example in which the turning-off condition is satisfied will be described below. In the third example, the turning-off condition determining unit 16 determines whether the turning-off condition is satisfied based on the result of comparison between the traveling state of the vehicle M under manual driving and the traveling state of the traveling plan when the automatic driving should have been maintained.

When a difference between a steering angle of the vehicle M under manual driving and a steering angle of the traveling plan when the automatic driving should have been maintained is equal to or greater than a steering angle threshold value, the turning-off condition determining unit 16 determines that the turning-off condition is satisfied. The steering angle threshold value is a preset threshold value. Similarly to the above-mentioned distance threshold value, the steering angle threshold value decreases with the elapse of time after the driving state of the vehicle M is switched from automatic driving to manual driving.

Figure 6A:
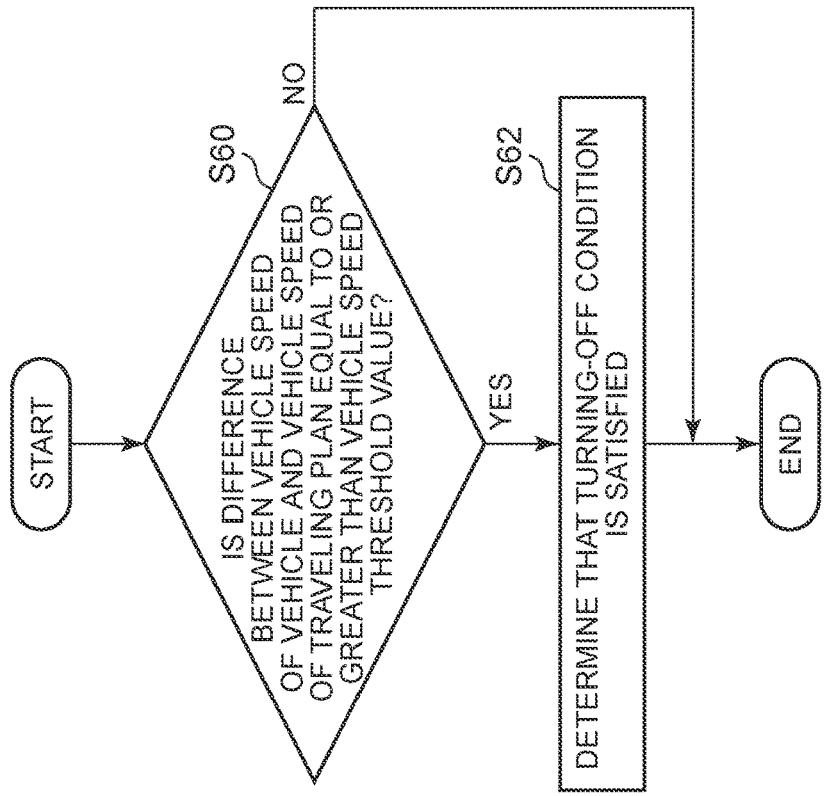
FIG. 6A is a flowchart illustrating a third example in which a turning-off condition is satisfied.

FIG. 6A is a flowchart illustrating the third example in which the turning-off condition is satisfied. As illustrated in FIG. 6A, in S50, the ECU 10 causes the turning-off condition determining unit 16 to determine whether the difference between the steering angle of the vehicle M under manual driving and the steering angle of the traveling plan when the automatic driving should have been maintained is equal to or greater than the steering angle threshold value. The turning-off condition determining unit 16 performs the determination based on the steering angle of the vehicle M recognized by the traveling state recognizing unit 12 and the traveling plan created by the traveling plan creating unit 14. The turning-off condition determining unit 16 can specify the steering angle of the traveling plan corresponding to the steering angle of the vehicle M under manual driving based on the elapsed time or the traveling distance after the driving state of the vehicle M is switched to manual driving.

When it is not determined that the difference between the steering angle of the vehicle M under manual driving and the steering angle of the traveling plan is equal to or greater than the steering angle threshold value (NO in S50), the ECU 10 ends the process flow. Thereafter, the ECU 10 performs the determination of S50 again after a predetermined time elapses. When it is determined that the turning-off condition is satisfied by another flowchart, the ECU 10 ends the flow of the flowchart illustrated in FIG. 6A en route. When it is determined that the difference between the steering angle of the vehicle M under manual driving and the steering angle of the traveling plan is equal to or greater than the steering angle threshold value (YES in S50), the ECU 10 performs S52.

In S52, the ECU 10 causes the turning-off condition determining unit 16 to determine that the turning-off condition is satisfied. Thereafter, the ECU 10 switches the direction indicator from the turned-on state to the turned-off state in S22 illustrated in FIG. 4B.

<Fourth example in which turning-off condition is satisfied> A fourth example in which the turning-off condition is satisfied will be described below. In the fourth example, similarly to the third example, the turning-off condition determining unit 16 determines whether the turning-off condition is satisfied based on the result of comparison between the traveling state of the vehicle M under manual driving and the traveling state of the traveling plan when the automatic driving should have been maintained. The fourth example is different from the third example, in that it is determined that the turning-off condition is satisfied when a difference between the vehicle speed of the vehicle M during manual driving and the vehicle speed (the target vehicle speed) of the traveling plan when automatic driving should have been maintained is equal to or greater than a vehicle speed threshold value.

The vehicle speed threshold value is a preset threshold value. Similarly to the above-mentioned distance threshold value, the vehicle speed threshold value decreases with the elapse of time after the driving state of the vehicle M is switched from automatic driving to manual driving.

Figure 6B:
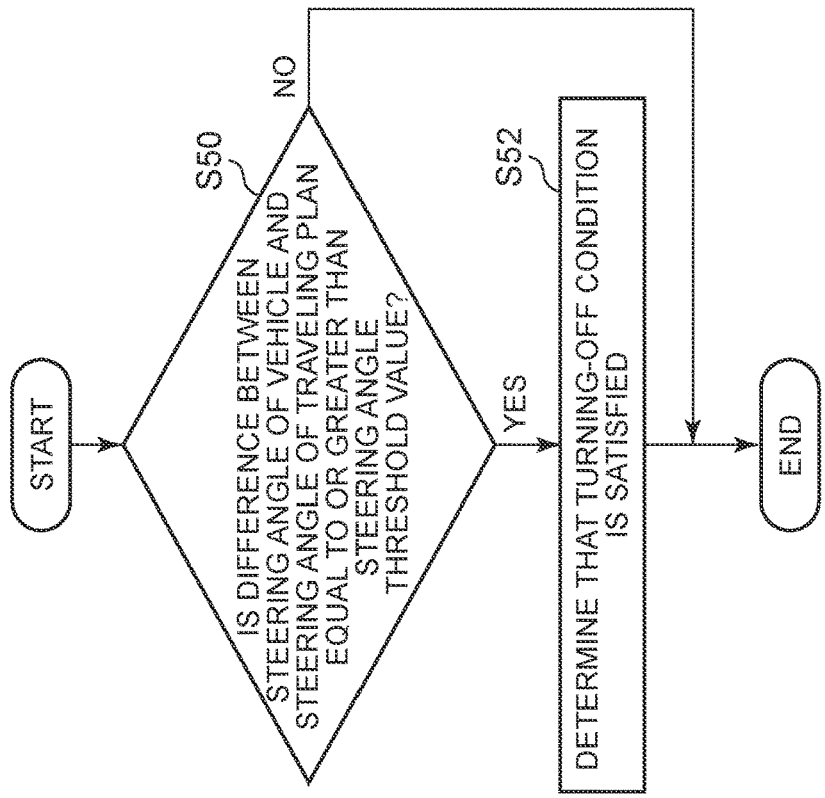
FIG. 6B is a flowchart illustrating a fourth example in which a turning-off condition is satisfied.

FIG. 6B is a flowchart illustrating the fourth example in which the turning-off condition is satisfied. As illustrated in FIG. 6B, in S60, the ECU 10 causes the turning-off condition determining unit 16 to determine whether the difference between the vehicle speed of the vehicle M under manual driving and the vehicle speed of the traveling plan when the automatic driving should have been maintained is equal to or greater than the vehicle speed threshold value. The turning-off condition determining unit 16 performs the determination based on the vehicle speed of the vehicle M recognized by the traveling state recognizing unit 12 and the traveling plan created by the traveling plan creating unit 14. The turning-off condition determining unit 16 can specify the vehicle speed of the traveling plan corresponding to the vehicle speed of the vehicle M under manual driving based on the elapsed time or the traveling distance after the driving state of the vehicle M is switched to manual driving.

When it is not determined that the difference between the vehicle speed of the vehicle M under manual driving and the vehicle speed of the traveling plan is equal to or greater than the vehicle speed threshold value (NO in S60), the ECU 10 ends the process flow. Thereafter, the ECU 10 performs the determination of S60 again after a predetermined time elapses. When it is determined that the turning-off condition is satisfied by another flowchart, the ECU 10 ends the flow of the flowchart illustrated in FIG. 6B en route. When it is determined that the difference between the vehicle speed of the vehicle M under manual driving and the vehicle speed of the traveling plan is equal to or greater than the vehicle speed threshold value (YES in S60), the ECU 10 performs S62.

In S62, the ECU 10 causes the turning-off condition determining unit 16 to determine that the turning-off condition is satisfied. Thereafter, the ECU 10 switches the direction indicator from the turned-on state to the turned-off state in S22 illustrated in FIG. 4B.

<Operational advantages of automatic driving system>

According to the above-mentioned automatic driving system 100 according to this embodiment, when the direction indicator of the vehicle M under automatic driving is in the turned-on state and the manual driving switching operation is performed by a driver, the turned-on state of the direction indicator is maintained. Accordingly, in comparison with a system of the related art in which the direction indicator is forcibly switched to the turned-off state when automatic driving is switched to manual driving, it is possible to prevent the direction indicator from being switched to the turned-off state in a situation in which the turned-on state of the direction indicator is required (for example, a situation in which the vehicle turns to the right or left). According to the automatic driving system 100, when it is determined that the turning-off condition is satisfied based on the position of the vehicle M during manual driving or the traveling state of the vehicle M during manual driving, the direction indicator is switched from the turned-on state to the turned-off state. Accordingly, it is possible to switch the direction indicator from the turned-on state to the turned-off state in a situation in which the direction indicator does not need to be turned on such a situation in which the vehicle M stops turning to the right or left and goes straight ahead. Accordingly, according to the automatic driving system 100, when the direction indicator of the vehicle M during automatic driving is in the turned-on state and the manual driving switching operation is performed by a driver, it is possible to appropriately control the direction indicator of the vehicle M.

According to the automatic driving system 100, since the turning-off condition determining unit 16 determines whether the turning-off condition is satisfied based on the result of comparison between the position Pm of the vehicle M during manual driving and the route Lp of the traveling plan when automatic driving should have been maintained, it is possible to recognize that the vehicle M departs from a situation in which the turned-on state of the direction indicator based on the traveling plane of the automatic driving is required and to appropriately switch the direction indicator to the turned-off state.

Specifically, in the first example, the automatic driving system 100 determines that the turning-off condition is satisfied when the shortest distance D between the position Pm of the vehicle M under manual driving and the route Lp of the traveling plan when the automatic driving should have been maintained is equal to or greater than the distance threshold value. In this case, in the automatic driving system 100, since a driver causes the vehicle M to travel in a direction away from the route Lp of the traveling plan and can recognize that the vehicle M departs from the situation in which the turned-on state of the direction indicator is required, it is possible to appropriately switch the direction indicator to the turned-off state. In the automatic driving system 100, since the distance threshold value decreases with the elapse of time after the driving state of the vehicle is switched from automatic driving to manual driving, it is determined whether the turning-off condition is satisfied according to the elapse of time and it is possible to appropriately switch the direction indicator to the turned-off state.

In the second example, the automatic driving system 100 determines that the turning-off condition is satisfied when the temporal variation of the shortest distance D between the position Pm of the vehicle M under manual driving and the route Lp of the traveling plan when the automatic driving should have been maintained does not satisfy the decreasing condition. In this case, in the automatic driving system 100, when the temporal variation of the shortest distance D does not satisfy the decreasing condition, a driver does not have an intention to return to the route of the traveling plan and it is conceived that the vehicle M under manual driving departs from the situation in which the turned-on state of the direction indicator is required. Accordingly, by determining that the turning-off condition is satisfied, it is possible to appropriately switch the direction indicator to the turned-off state.

The automatic driving system 100 determines whether the turning-off condition is satisfied based on the result of comparison between the traveling state of the vehicle M during manual driving and the traveling state of the traveling plan when automatic driving should have been maintained. In this case, in the automatic driving system 100, since a driver can recognize that the vehicle M departs from the situation in which the turned-on state of the direction indicator based on the traveling plan of the automatic driving is required based on the result of comparison between the traveling state of the vehicle M during manual driving and the traveling state of the traveling plan when automatic driving should have been maintained, it is possible to appropriately switch the direction indicator to the turned-off state.

Specifically, in the third example, the automatic driving system 100 determines that the turning-off condition is satisfied when the difference between the steering angle of the vehicle M under manual driving and the steering angle of the traveling plan when the automatic driving should have been maintained is equal to or greater than the steering angle threshold value. In this case, in the automatic driving system 100, since a driver steers the vehicle M in a direction away from the route Lp of the traveling plan and can recognize that the vehicle M departs from the situation in which the turned-on state of the direction indicator is required, it is possible to appropriately switch the direction indicator to the turned-off state. In the automatic driving system 100, since the steering angle threshold value decreases with the elapse of time after the driving state of the vehicle is switched from automatic driving to manual driving, it is determined whether the turning-off condition is satisfied according to the elapse of time and it is possible to appropriately switch the direction indicator to the turned-off state.

In the fourth example, the automatic driving system 100 determines that the turning-off condition is satisfied when the difference between the vehicle speed of the vehicle M under manual driving and the vehicle speed of the traveling plan when the automatic driving should have been maintained is equal to or greater than the vehicle speed threshold value. In this case, in the automatic driving system 100, since a driver can recognize that the vehicle M departs from the situation in which the turned-on state of the direction indicator is required by the driver's acceleration or deceleration, it is possible to appropriately switch the direction indicator to the turned-off state. In the automatic driving system 100, since the vehicle speed threshold value decreases with the elapse of time after the driving state of the vehicle is switched from automatic driving to manual driving, it is determined whether the turning-off condition is satisfied according to the elapse of time and it is possible to appropriately switch the direction indicator to the turned-off state.

While an exemplary embodiment of the disclosure has been described above, the disclosure is not limited to the embodiment. The disclosure can be modified and altered in various forms based on knowledge of those skilled in the art as well as the above-mentioned embodiment.

For example, the distance threshold value, the steering angle threshold value, and the vehicle speed threshold value may be fixed values.

Figure 7:
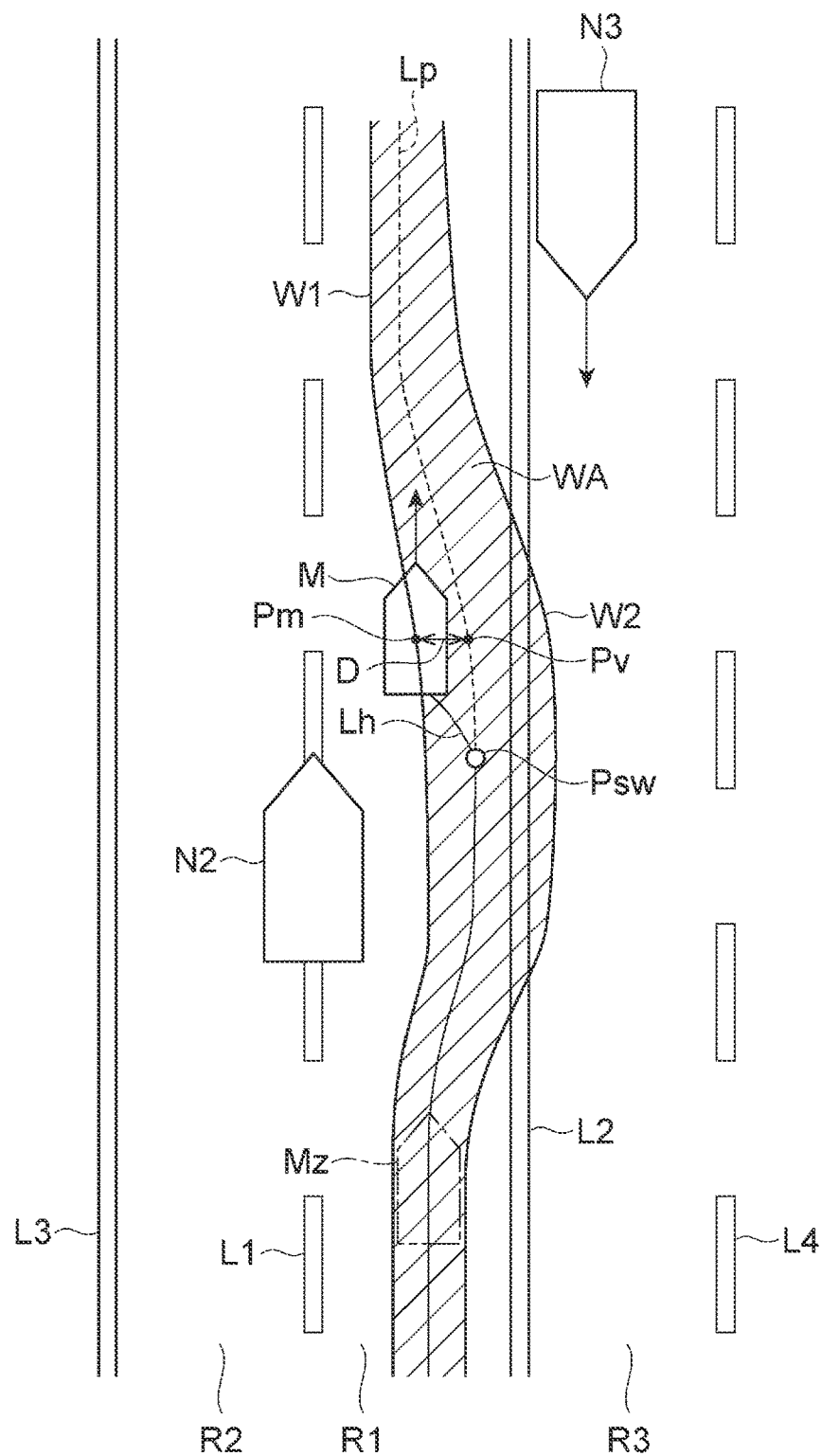
FIG. 7 is a plan view illustrating a situation in which the automatic driving is switched to the manual driving when a vehicle under automatic driving travels to avoid an obstacle.

The automatic driving system 100 may switch the distance threshold value depending on the steering direction of the vehicle M during manual driving. Here, FIG. 7 is a plan view illustrating a situation in which a driving state of a vehicle M during automatic driving is switched to manual driving at the time of avoiding an obstacle. In FIG. 7, a traveling lane R1 on which the vehicle M travels, a neighboring lane R2 which is adjacent to the traveling lane R1, and an opposite lane R3 which is adjacent to the traveling lane R1 are illustrated. A white line L1 for distinguishing the traveling lane R1 and the neighboring lane R2 from each other, a white line L2 for distinguishing the traveling lane R1 and the opposite lane R3 from each other, a white line L3 for forming the neighboring lane R2 along with the white line L1, and a white line L4 for forming the opposite lane R3 along with the white line L2 are illustrated.

Another vehicle N2 illustrated in FIG. 7 is a large vehicle which stops on the white line L1 in emergency. An oncoming vehicle N3 is a large vehicle which travels on the opposite lane R3 to be close to the traveling lane R1. Mz illustrated in FIG. 7 denotes the vehicle M in the past during automatic driving with the right direction indicator in the turned-on state when the vehicle temporarily approaches the opposite lane R3 to avoid another vehicle N2 stopping on the white line L1 as an obstacle.

In the situation illustrated in FIG. 7, in order to prevent the vehicle M from approaching the oncoming vehicle N3, a driver performs the manual driving switching operation in the middle of avoiding the obstacle by automatic driving and then rapidly returns the vehicle M to the central position of the traveling lane R1 to take a distance from the oncoming vehicle N3 by manual driving.

In the situation illustrated in FIG. 7, the allowable range WA (a range in which the turned-on state of the direction indicator is maintained) which is determined by the distance threshold value is narrower on the left side of the vehicle M than on the right side of the vehicle M. That is, when the vehicle M is turned to the left side (a direction in which the vehicle is returned to the central position of the traveling lane R1), the distance threshold value is smaller than when the vehicle M is turned to the right side (a direction in which the vehicle is spaced away from the central position of the traveling lane R1). In this way, in the automatic driving system 100, when the vehicle M is turned in the direction in which the vehicle is returned to the central position of the traveling lane R1, the necessity for maintaining the turned-on state of the direction indicator decreases and thus it is possible to appropriately switch the direction indicator to the turned-off state by setting the distance threshold value to a smaller value.

The disclosure can be applied to lane change of the vehicle M in addition to turning to the right or left at a crossing and avoidance of an obstacle. An example of the avoidance of an obstacle has been described above with reference to FIG. 7, but the distance threshold value may be switched depending on the steering direction of the vehicle M under manual driving in the case of the turning to the right or left at a crossing or the lane change. For example, in a case in which the driving state of the vehicle M is switched from automatic driving to manual driving at the time of turning to the right or left at a crossing, the automatic driving system 100 may set a smaller distance value when the vehicle M is turned in the same direction as the route Lp of the traveling plan than when the vehicle M is turned in the opposite direction of the route Lp of the traveling plan. In a case in which the driving state of the vehicle M is switched to automatic driving to manual driving during the lane change, the automatic driving system 100 may set a smaller distance value when the vehicle M is turned in the opposite direction of the lane change (a direction in which the vehicle is returned to a current traveling lane) than when the vehicle M is turned in the same direction as the lane change (a direction in which the vehicle moves to a neighboring lane of a destination of the lane change).

In addition to the distance threshold value, the steering angle threshold value can also be set in the same way. That is, the automatic driving system 100 may switch the steering angle threshold value depending on the steering direction of the vehicle M during manual driving. In the situation illustrated in FIG. 7, when the vehicle M is turned to the left side (a direction in which the vehicle is returned to the central position of the traveling lane R1), the steering angle threshold value may be set to be smaller than when the vehicle M is turned to the right side (a direction in which the vehicle is spaced away from the central position of the traveling lane R1). The steering angle threshold value in the case of the turning to the right or left at a crossing or the lane change can be set in the same way as the distance threshold value.

In the third example, the steering angle of the vehicle M has been used for description, but a steering torque instead of the steering angle may be used. A bearing angle vector of the vehicle M may be used or a tire cutting angle may be used. The steering angle of a traveling plan may employ a curvature of a route Lp of a traveling plan. In the fourth example, the vehicle speed of the vehicle M has been used for description, but an acceleration/deceleration (an acceleration and a deceleration) may be used instead of the vehicle speed.

In the above-mentioned embodiment, the first to fourth examples have been described as examples in which the turning-off condition is satisfied, but any one example may be performed. When there are a plurality of cases in which the turning-off condition is satisfied, an priority order may be given to the cases. For example, when a driver performs an operation of switching the direction indicator lever, the turning-off condition determining unit 16 may determine that the turning-off condition is satisfied regardless of the other determination results. When the vehicle M under manual driving reaches a turning-off time at which the direction indicator has been scheduled to be switched to the turned-off state in the traveling plan when automatic driving should have been maintained, the turning-off condition determining unit 16 may determine that the turning-off condition is satisfied regardless of the other determination results. When the temporal variation of the shortest distance D satisfies the decreasing condition (when a driver drives the vehicle M to return to the route Lp of the traveling plan), the turning-off condition determining unit 16 may maintain the turned-on state of the direction indicator even if the vehicle speed of the vehicle M is equal to or greater than the vehicle speed threshold value.

In the above-mentioned embodiment, whether the turning-off condition is satisfied is determined using the result of comparison between the vehicle M during manual driving and the traveling plan, but whether the turning-off condition is satisfied may be determined based on the position of the vehicle M during manual driving or the traveling state of the vehicle M. When the driving state of the vehicle M is switched from automatic driving to manual driving at the time of turning to the right or left at a crossing and it is recognized that the vehicle M departs from the crossing based on the position of the vehicle M during manual driving, the turning-off condition determining unit 16 may determine that the turning-off condition is satisfied. When it is recognized that the vehicle M is separated a separated distance threshold value or more from the manual driving switching point Psw based on the position of the vehicle M during manual driving, the turning-off condition determining unit 16 may determine that the turning-off condition is satisfied. When it is recognized that the vehicle M travels a traveling distance threshold value or more from the vehicle speed of the vehicle M based on the traveling state of the vehicle M during manual driving, the turning-off condition determining unit 16 may determine that the turning-off condition is satisfied. When it is recognized that the steering angle of the vehicle M decreases from a first threshold value or more to less than a second threshold value (when a rotation angle of the steering wheel turned to a certain extent or more is returned to a zero position (an initial position) by a driver) based on the traveling state of the vehicle M during manual driving, the turning-off condition determining unit 16 may determine that the turning-off condition is satisfied. The separated distance threshold value, the traveling distance threshold value, the first threshold value, and the second threshold value are preset values.

What is claimed is:

1. An automatic driving system that switches a driving state of a vehicle from automatic driving to manual driving due to a manual driving switching operation performed by a driver during automatic driving of the vehicle, the automatic driving system comprising:
   an electronic control unit configured to:
   determine that a direction indicator of the vehicle under the automatic driving is in a turned-on state;
   determine whether the manual driving switching operation is performed by the driver based on a recognition result of a driver operation recognizing unit;
   determine whether a preset turning-off condition is satisfied based on determining that the direction indicator of the vehicle under the automatic driving is in the turned-on state and that the manual driving switching operation is performed by the driver; and
   switch a driving state of the vehicle from the automatic driving to the manual driving and maintain the turned-on state of the direction indicator when the direction indicator of the vehicle under the automatic driving is in the turned-on state and the manual driving switching operation has been performed by the driver,
   wherein the electronic control unit determines whether the turning-off condition is satisfied based on a position of the vehicle under the manual driving or a traveling state of the vehicle under the manual driving, and switches the direction indicator from the turned-on state to a turned-off state when it is determined that the turning-off condition is satisfied.

2. The automatic driving system according to claim 1, wherein the electronic control unit determines whether the turning-off condition is satisfied further based on a result of comparison between the position of the vehicle under the manual driving and a route of a traveling plan when the automatic driving is maintained.

3. The automatic driving system according to claim 2, wherein the electronic control unit determines that the turning-off condition is satisfied when a shortest distance between the position of the vehicle under the manual driving and the route of the traveling plan when the automatic driving is maintained is equal to or greater than a distance threshold value, and the distance threshold value decreases with an elapse of time after the driving state of the vehicle is switched from the automatic driving to the manual driving.

4. The automatic driving system according to claim 2, wherein the electronic control unit determines that the turning-off condition is satisfied when a temporal variation of a shortest distance between the position of the vehicle under the manual driving and the route of the traveling plan when the automatic driving is maintained does not satisfy a preset decreasing condition.

5. The automatic driving system according to claim 1, wherein the electronic control unit determines whether the turning-off condition is satisfied further based on a result of comparison between a traveling state of the vehicle under the manual driving and a traveling state of a traveling plan when the automatic driving is maintained.

6. The automatic driving system according to claim 5, wherein the electronic control unit determines that the turning-off condition is satisfied when a difference between a steering angle of the vehicle under the manual driving and a steering angle of the traveling plan when the automatic driving is maintained is equal to or greater than a steering angle threshold value, and the steering angle threshold value decreases with an elapse of time after the driving state of the vehicle is switched from the automatic driving to the manual driving.

7. The automatic driving system according to claim 5, wherein the electronic control unit determines that the turning-off condition is satisfied when a difference between a vehicle speed of the vehicle under the manual driving and a vehicle speed of the traveling plan when the automatic driving is maintained is equal to or greater than a vehicle speed threshold value, and the vehicle speed threshold value decreases with an elapse of time after the driving state of the vehicle is switched from the automatic driving to the manual driving.

8. A vehicle control method comprising:
   causing an electronic control unit (ECU) to perform automatic traveling control of causing a vehicle to travel automatically and to turn on and off a direction indicator of the vehicle with performing of the automatic traveling control;
   causing the ECU to turn the direction indicator on during performing of the automatic traveling control;
   causing the ECU to determine whether a predetermined operational input from a user is detected during performing of the automatic traveling control based on a recognition result of a driver operation recognizing unit;
   causing the ECU to switch a driving control of the vehicle from the automatic traveling control to manual traveling control based on the ECU determining that the predetermined operational input from the user is detected during performing of the automatic traveling control;
   causing the ECU to determine whether a preset turning-off condition of the direction indicator is satisfied based on a traveling state of the vehicle, based on causing the ECU to switch the driving control of the vehicle from the automatic traveling control to the manual traveling control and based on causing the ECU to turn the direction indicator on; and
   causing the ECU to control the direction indicator such that the direction indicator is turned on when the turning-off condition is not satisfied and the direction indicator is turned off when the turning-off condition is satisfied.

* * * * *